L. CAMPBELL.
BALE WIRE TOOL.
APPLICATION FILED NOV. 19, 1919.
1,430,623.
Patented Oct. 3, 1922.
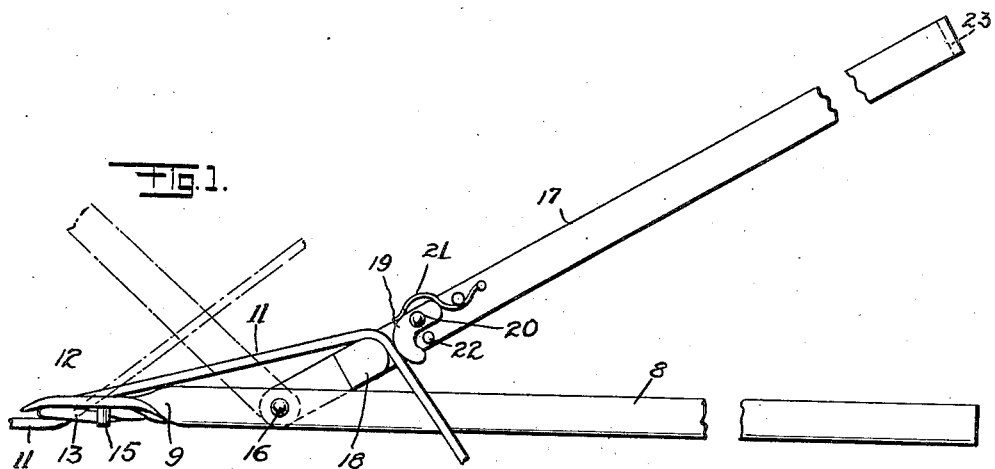
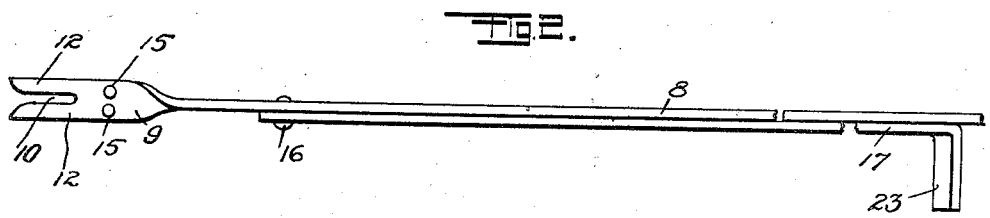
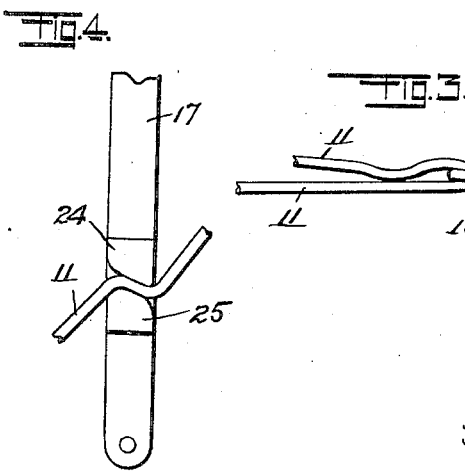
Inventor
LAYARD CAMPBELL
By his Attorney Patented Oct. 3, 1922.

1,430,623

UNITED STATES PATENT OFFICE.

LAYARD CAMPBELL, OF NEW YORK, N. Y., ASSIGNOR TO JOHN W. LESLIE AND JOHN H. LESLIE, BOTH OF CHICAGO, ILLINOIS.

BALE-WIRE TOOL.

Application filed November 19, 1919. Serial No. 339,008.

*To all whom it may concern:*

Be it known that I, LAYARD CAMPBELL, a citizen of the United States, and a resident of the city of New York, borough of Manhattan, in the county and State of New York, have invented certain new and useful Improvements in Bale-Wire Tools, of which the following is a full, clear, and exact description.

Among the principal objects which the present invention has in view are: to reduce the weight of tools of the character mentioned; to shorten the time required in performing the operation by said tools; and to secure the wire without permitting the same to slacken.

*Drawings.*

Figure 1 is a side view of a tool of the character mentioned, constructed and arranged in accordance with the present invention, showing in conjunction therewith fragments of a bale wire held by the tool in operative relation;

Figure 2 is a bottom view of the same, the fragments of bale wire being omitted; and Figure 3 is a view showing two end fragments of the bale wire, disposed in the relation formed by the operation of the tool.

Figure 4 is a detail view showing a modified device for holding the free end of the wire being tightened on package.

*Description.*

Heretofore bale wires have been secured to packing cases, boxes and other cartons, by tools of various shape and construction, which have been faulty in several particulars. They have been too heavy, and have been unwieldy in operation. Also objection has been found to the complication of construction and to the cost of the former tools.

In the present invention a claw bar 8 is furnished preferably formed from a bar of metal, the end 9 of which is twisted as seen in the drawings, to a plane perpendicular to the plane of the extension of said bar. The end 9 of the bar is bifurcated to form the open end slot 10. The slot 10 is adapted to receive the bale wire 11, when the tines 12 of the claw bar are extended over the loop 13 of the bale wire.

The bale wires are furnished each with a loop 13, formed by twisting the end of the wire back upon itself. The free end of the bale wire is passed through the loop after the bale wire has been loosely adjusted around a bale or package. It is then that the tool herein described is brought into operation by placing the tines 12 of the claw bar above the loop 13 and by passing the free end of the bale wire 11 to the inner end of the slot 10. In this position it will be found the twisted section 14 of the bale wire, adjacent the loop 13, extends between the pins 15, which are projected from the under side of the end 9 of the claw bar. In practice the pins 15 rest against the sides of the loop 13 at the inner end thereof.

Pivotally mounted on the claw bar 8, by means of a pivot pin 16, is a lever 17. The lever 17 is preferably constructed of the same material as the claw bar 8, and is provided with a gripping block 18, and dog 19. The dog 19 is provided, to frictionally engage the wire 11. The dog 19 has a pivot 20, on which it turns when drawn by the wire 11. Normally the dog is held away from the block 18 by a release spring 21, which presses the dog 19 against the stop pin 22 when the dog is not engaged by the wire 11.

The free end of the lever 17 is bent to form a handle 23, as best seen in Figure 2 of the drawings. The operator employs the handle 23 to rock the lever 17 forward from the position shown in full lines in Figure 1 to the position indicated by dotted lines therein. In this position it will be seen the dog 19 being held open by the spring 21, the free end of the wire 11, which has been extended through the loop 13 and slot 10, is easily placed between the block 18 and the dog 19. The operator now manually depresses the dog 19, until it engages firmly the wire 11.

In this position the lever 17 is drawn toward the position shown by full lines in Figure 1. In the inauguration of this movement of the lever 17, the dog 19 grips the wire 11, and holds the same rigidly, the grip thereon increasing with the strain on the wire imparted by the lever 17.

After the dog 19 has become firmly engaged with the wire 11, the operator holds the bar 8 with the one hand, while forcefully drawing the lever with the other hand, until the desired stress or strain has been imparted to the wire 11. During the operation of drawing the free end of the wire 11 through the loop 13, the loop 13 is held stationary by the pins 15, so that when the bale wire is sufficiently tightened the loop 13 is in the position assumed thereby at the beginning of the operation.

The wire 11 having been drawn tight, the operator now holding the lever 17 firmly lifts the bar 8, and rocks the same on the tines 12, and the loop 13, until the lever 17 has carried fully over to lie on the bale or package. In doing this it will be found the free end of the wire 11 has been drawn tightly around and lapped over the loop 13, to the position substantially as shown in Figure 3 of the drawings. In this position the strain on the wire 11 is not sufficient to straighten the said wire.

To insure against accident, the operator now grips the surplus material from the free end of the wire 11, and sets the end thereof down, either passing it under the adjacent extension of the wire 11, or returns the same back against the loop 13, forming a complete wrap thereabout.

While I have herein described the dog 19 as having a toothed surface for engaging the wire 11, the same result may be attained by providing the teeth on the block 18, and furnishing the dog 19 with a free edge.

In Figure 4 of the drawings a modified form of the invention is shown, the modification consisting in providing the lever 17 with two stationary blocks, 24 and 25. The blocks 24 and 25, as shown, are disposed in spaced relation, the said blocks being removed from each other to form a passage therebetween, wherein the operator may place the wire 11 when the lever 17 is disposed in the position shown by dotted lines in Figure 1.

After the wire has been placed in the passage between the blocks 24 and 25, the wire is manually bent or snubbed around the sharp edge of the block 24, to prevent the wire slipping when the strain of drawing the same is imparted by the lever 17. As the lever 17 is rocked on its pivot to the position shown in full lines in Figure 1, the bite of the wire over the forward edge of the block 25 holds the same in conjunction with the block 24 as rigidly as it would be held by the dog 19.

The tool herein described may be constructed of as light a material as the employment permits. The tool is, therefore, as light as may be commensurate with the strength required. By removing the pin 16 the bar 8 and lever 17 may be separated, and packed in close relation, thereby reducing the size of the packet, and avoiding the discomfort of an otherwise awkwardly shaped packet.

*Claims.*

1. A tool as characterized comprising a bar having a bifurcated extremity, and means for operatively engaging a loop formed at one end of a bale wire and at the outer side thereof to hold said loop while the wire is being stretched; a lever pivoted on said bar adjacent the bifurcated extremity thereof; and means mounted on said lever for engaging the free end of said wire when said lever is rocked forward, said means embodying a sinuous passage through which said wire may be extended.

2. A tool as characterized comprising a bar having a bifurcated extremity, and means for operatively engaging a loop formed at one end of a bale wire and at the outer side thereof to hold said loop while the wire is being stretched; a lever pivoted on said bar adjacent the bifurcated extremity thereof; means mounted on said lever for engaging the free end of said wire when said lever is rocked forward, said means embodying a side opening passage; and a rocking member for contracting said passage when said member is engaged by said wire.

3. A tool as characterized comprising a bar having a bifurcated extremity, and means for operatively engaging a loop formed at one end of a bale wire and at the outer side thereof to hold said loop while the wire is being stretched; a lever pivoted on said bar adjacent the bifurcated extremity thereof; and means mounted on said lever for engaging the free end of said wire when said lever is rocked forward, said means embodying a gripping block extended from the side of said lever, and a pawl pivotally mounted on the side of said lever to normally close upon said block for engaging said wire when disposed therebetween.

LAYARD CAMPBELL.